Feb. 18, 1936.  E. H. MUELLER  2,031,121
VALVE STRUCTURE
Filed May 12, 1934
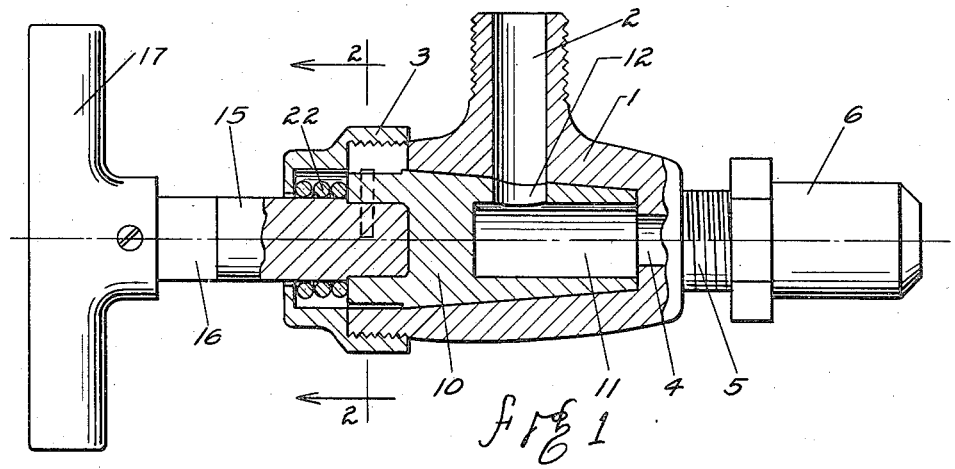
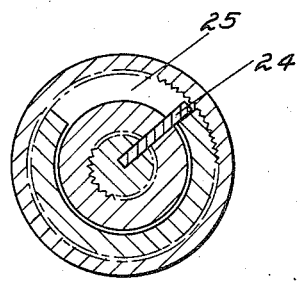
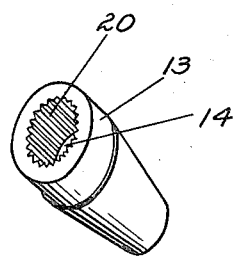
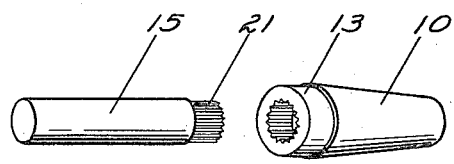
INVENTOR.
ERVIN H. MUELLER.
BY
ATTORNEY.

Patented Feb. 18, 1936

2,031,121

UNITED STATES PATENT OFFICE 2,031,121

VALVE STRUCTURE

Ervin H. Mueller, Detroit, Mich.

Application May 12, 1934, Serial No. 725,230

2 Claims. (Cl. 251—101)

This invention relates to a valve structure and has to do particularly with a valve and valve stem structure.

The invention is concerned with a valve structure of the kind which is useful for controlling the flow of fuel gas to the burners of the stove or the like. The members of such an ordinary valve constituting the valve member and the valve stem by which the same is operated, have been made largely from one piece of stock. The stem portion has a diameter or cross-sectional dimension less than that of the maximum diameter or cross-sectional dimension of the valve portion. Accordingly, when made from one piece of stock there is considerable wastage, in that the stock has to be turned down to produce the smaller stem portion. The valve member is constructed with passageways, recesses or apertures for the passage of gas therethrough, and if any sort of a connection is made through the wall bounding such recess or passageway, for the purpose of uniting a stem thereto, a joint results which may cause undesirable leakage of gas therethrough. The invention aims to provide a novel connection between the valve member and stem with these two made from different pieces of stock, which connection is extremely strong and secure and which exposes no joints or connecting parts, and which does not utilize any gas flow passage in the valve member.

Fig. 1 is a view of a valve structure made in accordance with the invention showing the valve body and the valve member in cross section.

Fig. 2 is a cross-sectional view taken substantially on line 2—2 of Fig. 1.

Fig. 3 is a perspective view of the valve member.

Fig. 4 is a perspective view of the valve member and stem member in detached relation.

Fig. 5 is a side elevation of the completed valve member.

The valve body is illustrated at 1 and it may have an inlet port 2 for attachment to a gas supply line or manifold pipe. The valve body is hollow, as shown, and it may be screwthreaded at one end for the reception of a cap 3. It may have an outlet passageway 4 and a screwthreaded extension 5, to which a suitable outlet jet 6 may be attached.

The valve member is shown at 10 arranged to fit within the hollow body, and it is provided with a recess 11, the open end of which communicates with the outlet passageway 4. A port 12 is provided in the wall of the valve member and arranged to be brought into and out of alignment with the inlet passageway 2. It will be readily appreciated how the passageways 2 and 4 may be connected or disconnected by the turning of the valve 10.

The major portion of the valve 10 may be of frusto-conical form, although its larger end may be turned down into true cylindrical formation as shown at 13. This end of the valve is provided with a recess 14 which, as shown, in Fig. 1, does not communicate with the passageway 11. The valve stem is illustrated at 15 and, as will hereafter be more fully explained, may comprise bar stock. The same may be flattened as at 16 for the reception of a handle 17.

For the purpose of connecting the valve member and stem, one end of the stem is to be assembled in the recess 14. These two members are, of course, to be assembled together so that they are incapable of relative rotation. The preferred manner of assembling the two members is that of employing interfitting serration formations. Accordingly, the walls of the recess 14 are provided with serrations 20 and this may be done by a broaching operation. Cooperating serrations as at 21 are provided on one end of the stem 15. This is preferably done by rolling the serrations in the bar stock. The serrated end is inserted in the recess 14 and the two parts are held against relative rotational movement. Preferably, the fit of the part 21 in the recess 14 is very tight; as for example, the parts may be press fitted together. The assembly of the valve member and stem in the valve body is accomplished through the means of the cap 3 screwthreaded to the body, the cap having an aperture for the passage of the stem therethrough. In order to hold the valve seated in the body a coil spring 22 may be disposed between the end of the cap and the body of the valve. Rotational movement of the valve and stem in the body may be limited, and for this purpose a pin 24 may be located in the valve and designed to operate in a slot 25 formed by cutting away a portion of the end of the body member. The pin stops against opposite ends of the slot and when in one position the valve is open and when in another position the valve is closed. This pin is preferably located in the valve member so that it projects into the end of the stem, as shown. This locks the valve member and the stem together from axial separation. However, it is to be pointed out that the pin does not necessarily take any of the turning torque transmitted to the valve member by the stem.

Heretofore, the practice has been largely to make the valve member and stem of one piece of stock. Such practice provides for a tight valve in that there is no chance of gas leakage out of the passageway 11. However, it will be noted that there is considerable wastage to this, since the stock has to be turned down to provide the smaller stem portion. The valve of this invention eliminates this wastage and at the same time provides a valve equally as efficient, so far as gas leakage is concerned. The stem is attained by merely cutting off the desired length from bar stock with no wastage whatever, and the serration on one end may be cheaply provided by pressure, as for example, by rolling the serrations in the stock. The pin 24 which is necessary to limit the rotational movement of the valve, if such limitation is desired, is likewise necessary in a valve made from one piece, and this pin may herein serve the double service of limiting the rotation and of positively tying the valve member and stem together to prevent axial separation. The joint is strong and effective, and in fact is sufficiently strong so that the stem may be twisted off before the joint gives way. No looseness or wobbling is present, to the end that the appearance of united valve and stem is equal to a one-piece member.

I claim:

1. A valve member of unit construction for use with a hollow valve body having a tapered valve seat therein comprising, a tapered valve plug formed to fit into the tapered seat of the valve body and adapted to be turned relative to the seat to open and close the valve, the larger end of the plug having a recess therein disposed substantially on the turning axis of the plug, the walls of said recess having internal serrations thereon extending in an axial direction, a stem of bar stock having one end arranged to receive an operating handle and being of smaller cross dimension than the plug, the opposite end having serrations thereon extending in an axial direction, the serrated end of the stem being slightly oversize relative to the recess in the plug, and said serrated end of the stem being fitted into the recess with a driving fit, said serrations interfitting to lock the stem and plug together against relative rotation, and means for tying the plug and stem together against axial separation whereby the plug and stem are permanently assembled as a unitary structure, said unitary structure of plug and stem capable of being assembled in and disassembled from operating relation with the valve body.

2. A valve member of unit construction for use with a hollow valve body having a tapered valve seat therein comprising, a tapered valve plug formed to fit into the tapered seat of the valve body and adapted to be turned relative to the seat to open and close the valve, the larger end of the plug having a recess therein disposed substantially on the turning axis of the plug, the walls of said recess having internal serrations thereon extending in an axial direction, a stem of bar stock having one end arranged to receive an operating handle and being of smaller cross dimension than the plug, the opposite end having serrations thereon extending in an axial direction, the serrated end of the stem being slightly oversize relative to the recess in the plug, and said serrated end of the stem being fitted into the recess with a driving fit, said serrations interfitting to lock the stem and plug together against relative rotation, and a pin extending through a portion of the plug adjacent the recess and projecting into the serrated end of the stem to hold the plug and stem against axial separation whereby the two are permanently assembled as a unitary structure, said unitary structure of plug and stem capable of being assembled in and disassembled from operating relation with the valve body.

ERVIN H. MUELLER.